(12) United States Patent
Gnos et al.

(10) Patent No.: US 12,129,032 B2
(45) Date of Patent: *Oct. 29, 2024

(54) LAVATORY ARRANGEMENT

(71) Applicant: Pilatus Flugzeugwerke AG, Stans (CH)

(72) Inventors: Marcel Gnos, Schattdorf (CH); Simon Koch, Hergiswil (CH)

(73) Assignee: Pilatus Flugzeugwerke AG, Stans (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,903

(22) Filed: Mar. 6, 2023

(65) Prior Publication Data
US 2023/0271705 A1 Aug. 31, 2023

Related U.S. Application Data

(63) Continuation of application No. 16/613,881, filed as application No. PCT/IB2017/000588 on May 17, 2017, now Pat. No. 11,618,569.

(51) Int. Cl.
*B64D 11/02* (2006.01)
*E03D 11/12* (2006.01)
*E03F 1/00* (2006.01)

(52) U.S. Cl.
CPC ............. *B64D 11/02* (2013.01); *E03D 11/12* (2013.01); *E03F 1/006* (2013.01)

(58) Field of Classification Search
CPC ........... B64D 11/02; E03D 11/12; E03F 1/006

USPC ...................................................... 244/118.1
See application file for complete search history.

(56) References Cited

U.S. PATENT DOCUMENTS

| 2,076,950 | A | | 5/1935 | Koch | |
|---|---|---|---|---|---|
| 2,799,864 | A | * | 7/1957 | Colonna | E03D 5/02 4/312 |
| 3,436,764 | A | * | 4/1969 | Colonna | E03D 11/12 4/300 |
| 6,986,171 | B1 | * | 1/2006 | Perrin | E03D 11/12 4/312 |
| 2014/0245531 | A1 | * | 9/2014 | Carver | E03C 1/01 138/155 |
| 2017/0121025 | A1 | * | 5/2017 | Ooi | B64D 11/02 |

FOREIGN PATENT DOCUMENTS

| DE | 102012003713 A1 | 8/2013 | |
|---|---|---|---|
| EP | 0850833 A2 * | 12/1997 | ............. B64D 11/02 |
| WO | 9726153 A1 | 7/1997 | |
| WO | 2007138129 A1 | 12/2007 | |
| WO | WO-2011048544 A1 * | 4/2011 | ............. E03D 11/12 |

OTHER PUBLICATIONS

International Search Report and Written Opinion for PCT/IB2017/000588 mailed Mar. 2, 2018 (11 pages).

* cited by examiner

*Primary Examiner* — Christine J Skubinna
(74) *Attorney, Agent, or Firm* — Brooks Kushman P.C.

(57) ABSTRACT

In a lavatory arrangement comprising a vacuum flushing system, the lavatory arrangement comprises a folding toilet bowl.

21 Claims, 12 Drawing Sheets

LAVATORY ARRANGEMENT

CROSS-REFERENCE TO RELATED APPLICATIONS

Figure 1:
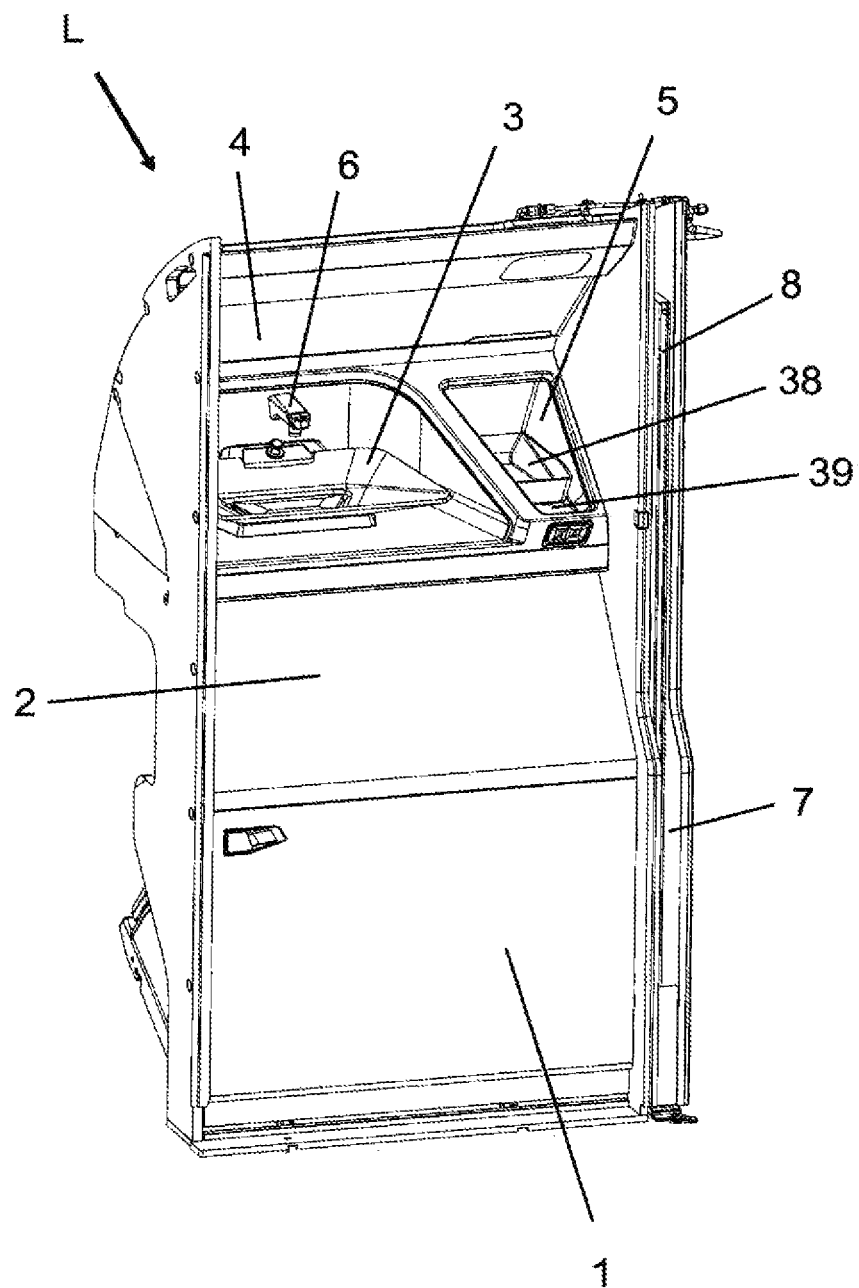

This application is a continuation of U.S. application Ser. No. 16/613,881 filed Nov. 15, 2019, now U.S. Pat. No. 11,618,569, issued Apr. 4, 2023, which is the U.S. national phase of PCT Application No. PCT/IB2017/000588, filed May 17, 2017, the disclosures of which are hereby incorporated in their entirety by reference herein.

TECHNICAL FIELD

This disclosure relates to a lavatory arrangement for a vehicle and method(s) using the lavatory arrangement.

BACKGROUND

In small aircraft (e.g. aircraft for approximately 6 to 15 passengers), it is often problematic to install a lavatory in an appropriate way. Ideally, different requirements should be met: the lavatory should be easy to access and comfortable to use but should also not take up too much space and should not add too much weight to the aircraft.

It is known for example to install a lavatory at the rear of an aircraft. However, this solution has the disadvantage of limiting the space for luggage, which is typically stored in the rear of the aircraft or at least of blocking access to the luggage during the flight.

It is also known to install a toilet in the front of the cabin and to allow transforming a part of the front of the cabin into a closed lavatory compartment when using the toilet. However, since there is typically not much space available at this location of the air-craft, typically chemical toilets are used in this case. This is, however, not the most comfortable solution. One reason for this is that the servicing and/or emptying of such chemical toilets is typically only possible from the inside of the aircraft, and these actions can thus lead to pollution of the aircraft interior. In general, chemical toilets also have the disadvantage of creating bad smells.

BRIEF SUMMARY OF THE DISCLOSURE

It is the object of the disclosure to make space for luggage storage, to minimize blocking access to luggage, and to minimize the use of chemicals for toilets. In particular, it is the objective of the disclosure to provide a lavatory arrangement for a small aircraft that is comfortable to use and that does not require a lot of space.

A lavatory arrangement is disclosed that comprises a vacuum flushing system, wherein the lavatory arrangement comprises a folding toilet bowl. "Folding" is to be understood such that the lavatory arrangement is configured such that the toilet bowl has two possible states, namely a folded-out state and a folded-away state. In its folded-out state, the toilet bowl can be used by a passenger. In its folded-away state, the toilet bowl is stored away and does not take up much space. The term "vacuum flushing system" is to be understood as follows: waste located inside the toilet bowl after use by a passenger can be sucked away under pressure and can be led to a waste container separated from the toilet bowl at least by using of a waste hose or the like. Due to the fact that the lavatory arrangement comprises such a vacuum flushing system, the lavatory arrangement is comparably comfortable, because waste located inside the toilet bowl after use by a passenger can be sucked away under pressure—instead of simply being dumped into a recipient with a chemical agent as it is the case in chemical toilets. Like this, the risk of bad smells can be significantly reduced and user comfort is increased.

According to an example embodiment, the lavatory arrangement is an aircraft lavatory arrangement. Especially in an aircraft, the lavatory arrangement is particularly advantageous because space is always an issue in aircraft. However, the lavatory arrangement can for example also be used in camper vans, mobile homes, buses, boats, trains, military vehicles, shelters or yet space vessels.

According to an embodiment, the lavatory arrangement comprises a tiltable flap, wherein the tiltable flap is configured to facilitate an unfolding of the toilet bowl. It has been found that such a tiltable flap—which typically has a certain mass—can advantageously be used for helping to unfold the toilet bowl—that is, for moving it from its folded-away state into its folded-out state. The lavatory arrangement is typically configured such that the tiltable flap is in a partly raised state when the toiled bowl is in its folded-away state and that a the tiltable flap is progressively released towards a dropped-down state when the toilet bowl is transferred to its folded-out state, while the movement of the tiltable flap facilitates the movement of the toilet bowl. Such a tiltable flap furthermore has the advantage that it can be used to partly cover the toilet bowl in its folded-away state and to release space—by swinging to its dropped-down state—when the toilet bowl is folded out and the lavatory arrangement is thus used. Such a tiltable flap is of course not necessary: the toilet bowl in its folded-away state could also be covered by a simple removable cover and/or the unfolding of the toilet bowl could be facilitated by a user pulling a handle or the like.

According to an example embodiment, the tiltable flap is linked to the toilet bowl using a lever arrangement. Such a lever arrangement is a reliable and yet simple way to link the toilet bowl to the tiltable flap. Furthermore, use of a lever arrangement has the additional advantage that it can also perform other duties when in motion. In certain embodiments, the lever arrangement comprises a first lever component and a second lever component which are linked to each other using a lever articulation. In some embodiments, the tiltable flap is arranged above the toilet bowl and the lever arrangement runs essentially vertically from the tiltable flap to the toilet bowl. Therein, "essentially vertically" means that there is no horizontal component in the path of the lever arrangement, but it does not necessarily mean that the lever has a straight form. An alternative to using a lever arrangement for linking the tiltable flap to the toilet bowl is using a cable or a wire rope.

According to an example embodiment, the lavatory arrangement comprises an exterior casing, wherein the exterior casing comprises a guiding channel for a waste hose, wherein the guiding channel preferably at least partly forms an elongated concavity when looked at from the direction of the toilet bowl. Foreseeing such a guiding channel for the waste hose is based on the following reasoning: in order to link the bottom of the toilet bowl to a waste container, a waste hose is needed. This waste hose must be sufficiently long for guaranteeing a sufficient distance between the toilet bowl and the waste container in order to reduce the risk of smells and it must not comprise too sharp bends in order to avoid congestion or jamming. One appropriate way to do this is to let the waste hose move away from the bottom of the toilet bowl not too steeply and to let it move upwards to a waste container at a certain distance from the toilet bowl while keeping the path of the waste hose as straight as possible. However, such a guiding of the waste hose needs space, especially space in the opposite direction of the one towards which the toilet bowl swings out. In other words: for guiding the waste hose in this manner, a certain depth of the lavatory arrangement is needed. For achieving this depth in an aircraft, the lavatory arrangement can either be placed more towards the interior of the aircraft, or in words: more into the cabin. This, however, obviously may reduce the cabin space. An alternative is to move the lavatory arrangement closer to the aircraft exterior wall. This solution however reduces the space between the lavatory arrangement's exterior casing and the aircraft exterior wall, leaving less space for insulation material and thus leading to a less well isolated aircraft. Surprisingly, this can be achieved by locally compressing such insulation material without impacting its insulation capacity too much. Because of all components of the lavatory arrangement's vacuum flushing system it is the waste hose that needs most space in the opposite direction of the one towards which the toilet bowl swings out, it suffices to foresee enough space for this waste hose. Thus, by foreseeing the guiding channel, the required space is given to the waste hose only, thus leading only to a local compression of the insulation material and leaving more space for the insulation material at locations behind the exterior casing where there is no such guiding channel.

According to an example embodiment, the lavatory arrangement comprises a funnel arrangement for filling a fresh water tank of the lavatory arrangement with fresh water from the inside of a vehicle, preferably an aircraft, in a case where the lavatory arrangement is installed in such a vehicle. Such a funnel arrangement has the advantage of making a fresh water supply for the lavatory arrangement particularly straightforward. According to an embodiment, the funnel arrangement comprises a funnel and a freshwater hose, wherein one end of the hose is preferably configured to be attached to the fresh water tank and the other end of the hose is preferably configured to be attached to the funnel. In a particular embodiment, the funnel arrangement is accessible through the tiltable flap, which is preferably configured such that it can be locked in an opened position, thus permitting access to the funnel arrangement. In a preferable embodiment, the freshwater hose is long enough to make it possible to take the funnel out of the lavatory arrangement through the opened tiltable flap and to then fill water into the fresh water tank through the funnel arrangement in a convenient way. Alternatively, or in combination with that, according to an embodiment, the lavatory arrangement is configured such that it can be filled with fresh water from the outside of the vehicle. According to an embodiment, the lavatory arrangement is configured such that waste can only be removed from the outside of the vehicle, for example through a waste collection point, and fresh water can only be supplied from the inside of the vehicle, for example using of the funnel arrangement. This has the advantage of guaranteeing a good hygiene, because a risk of contaminating the fresh water with waste is reduced.

According to an example embodiment, the lavatory arrangement comprises a door-and-wall arrangement for temporarily setting up a lavatory compartment inside a vehicle, preferably an aircraft, in a case where the lavatory arrangement is installed in such a vehicle. According to some embodiments, a first side wall of the lavatory arrangement comprises a sliding door which is configured to be pulled out of the side wall to create at least a partial separation between a user of the lavatory arrangement and a rest of the cabin. Such a door-and-wall arrangement is a very convenient way to create privacy for a user of the lavatory arrangement.

According to an example embodiment, the lavatory arrangement comprises a toilet cabinet door which is adapted to become a part of the door-and-wall arrangement when the toilet bowl is in its folded-out state. The toilet cabinet door is a door which covers the toilet bowl in its folded-away state. Such a toilet cabinet door has at least two advantages. The first one is that the sliding door can be smaller and thus lighter because it only has to create a partial separation. According to an example embodiment, the toilet cabinet door in its opened state is configured to form a lower separation between the lavatory arrangement in use and the rest of the cabin and the sliding door is configured to form an upper separation between the lavatory arrangement in use and the rest of the cabin. According to an example embodiment, the lower separation and the upper separation create an essentially complete separation wall between the lavatory arrangement in use and the rest of the cabin. The second advantage of such a toilet cabinet door is the fact that this particular use of the toilet cabinet door makes perfect use of the toilet cabinet door when the toilet bowl is in its folded-out position and avoids the toilet cabinet door encumbering a user of the lavatory arrangement. However, such a toilet cabinet door is not absolutely mandatory. For example, it would also be possible to not foresee any cover at all for the toilet bowl in its folded-away state.

According to an example embodiment, the lavatory arrangement comprises a sealing cover configured to close a gap between the toilet bowl and a carrying structure of the lavatory arrangement when the toilet bowl is in its folded-out state. Such a sealing cover is advantageous because it keeps waste, water and/or other liquids from passing the gap between the toilet bowl and the carrying structure of the lavatory arrangement and thereby polluting an interior of the lavatory arrangement.

According to an example embodiment, the toilet bowl comprises two essentially Y-formed carrying elements, preferably essentially made from carbon fiber, and/or the toilet bowl comprises cross beams preferably essentially made from metal for stabilizing the toilet bowl, and/or the toilet bowl comprises at least one housing sheet, preferably a multitude of light metal housing sheets. Such a configuration of the toilet bowl results in a light-weight toilet bowl with a sufficient stability. The Y-formed carrying elements lead to a good overall stability of the toilet bowl while leaving space for elements of a folding mechanism such as gas springs and the like and their fixings. The Y-formed elements, which are preferably located on a right and a left side of the toilet bowl, respectively, furthermore lead to a symmetrical force distribution when a user is sitting on the toilet bowl.

According to an example embodiment, the lavatory arrangement comprises at least one gas spring, preferably a multitude of gas springs, wherein the at least one gas spring preferably comprises a heating mechanism. The use of gas springs is advantageous because it is a simple and effective manner to move the toilet bowl and/or the tiltable flap from one state to another, respectively. According to an example embodiment, at least one gas spring is attached to the toilet bowl and at least one gas spring is attached to the tiltable flap. Surprisingly, it has been found that situations can arise where the movement of the toilet bowl is encumbered. In other words: The toilet bowl might sometimes not swing out properly. Such situations may arise after the aircraft was on the ground for a certain time with the engines switched off and especially when outside temperatures are low. Surprisingly, it has been found that the swinging out of the toilet bowl can be improved by making it possible to heat the gas springs, at least temporarily.

According to an example embodiment, the toilet bowl comprises a partly inclined top surface. In a particular embodiment, the top surface comprises an inclined area at least at one of its edges. Such a partly inclined top area can be foreseen for optimizing the distribution of forces inside the toilet bowl when a user props himself on the toilet, especially by avoiding that the user props himself on the toilet bowl too strongly. According to an example embodiment, the toilet bowl comprises a lateral compartment, preferably in a toilet bowl housing. Such a lateral compartment can be used for toilet paper, hygiene products or the like and is preferably located beneath the inclined area. Like this, the inclined are also facilitates the access of the user's hand to the lateral compartment.

A vehicle according to the disclosure, wherein the vehicle is preferably an aircraft, comprises a lavatory arrangement according to the disclosure.

According to an example embodiment, the vehicle comprises a cockpit and a cabin, wherein the lavatory arrangement is located between the cabin and the cockpit, wherein the vehicle preferably comprises a cabinet located between the cockpit and the lavatory arrangement, wherein a door of the cabinet is configured such that it can be swung against a cockpit door so as to temporarily create a barrier between a user of the lavatory arrangement and the cockpit.

A method according to the disclosure for using a lavatory arrangement comprising a vacuum flushing system, wherein the lavatory arrangement is installed in a cabin of a vehicle, comprises the following steps:

Opening a toilet cabinet door of the lavatory arrangement and positioning the toilet cabinet door in a separating position, wherein the toilet cabinet door is rotated by around 90 degrees in its separating position compared to when it is closed;

Pulling a sliding door out of a door slit of the lavatory arrangement such that the sliding door together with the toilet cabinet door forms a first side wall of a temporary lavatory compartment, wherein the first side wall at least partly separates the lavatory compartment from a rest of the cabin;

Swinging open a door of a cabinet located between the lavatory arrangement and a cockpit of the vehicle by approximately 90 degrees so as to separate the temporary lavatory compartment from the cockpit;

Bringing a toilet bowl, which has been made accessible by opening the toilet cabinet door, from a folded-away state into a folded-out state;

Using the lavatory arrangement;

Bringing the toilet bowl from its folded-out state into its folded-away state;

Closing the door of the cabinet located between the lavatory arrangement and the cockpit;

Pushing the sliding door back into the door slit;

Closing the toilet cabinet door.

The above-mentioned steps do not necessarily have to be carried out in the exact order as outlined above. For example, it is of course possible to first pull out the sliding door and then open the toilet cabinet door in a second step to set up the first side wall as a combination of the sliding door and the toilet cabinet door. However, inversing the order of other steps might not always make sense, for example using the lavatory arrangement before the first wall is set up or using the lavatory arrangement before the toilet bowl has been brought from its folded-away position into its folded-out position.

SHORT DESCRIPTION OF THE FIGURES

Figure 2:
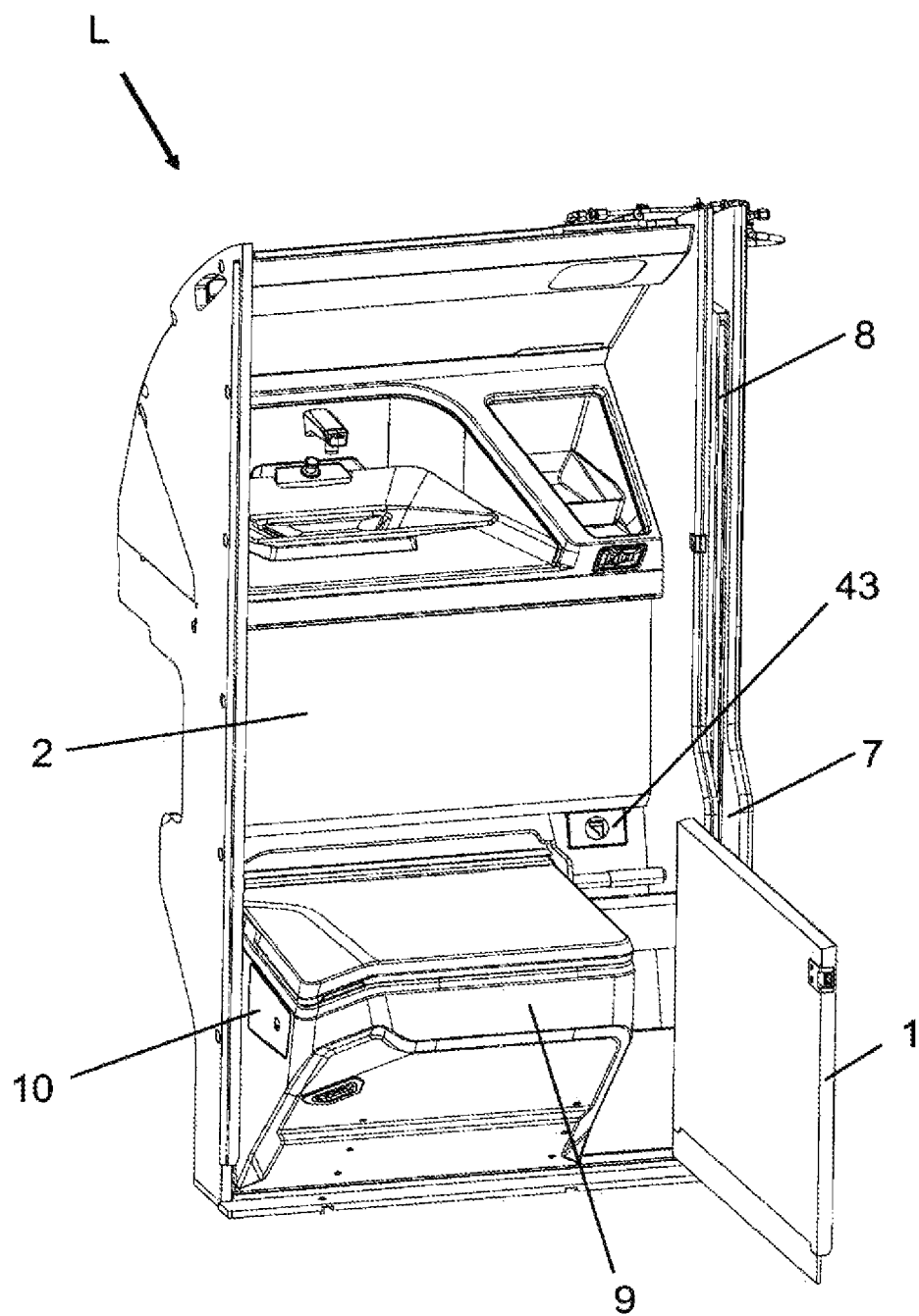
Figure 3:
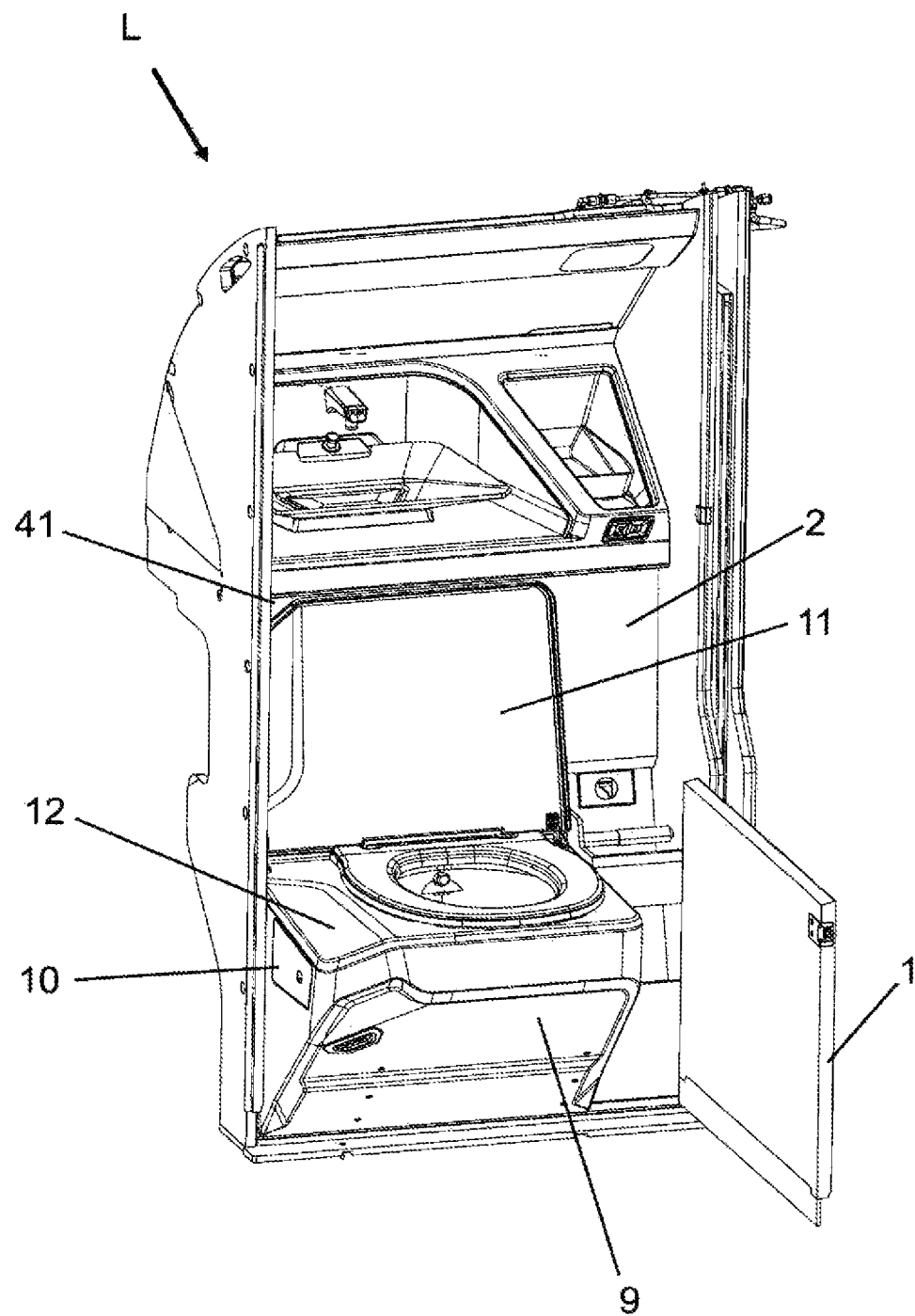
Figure 4:
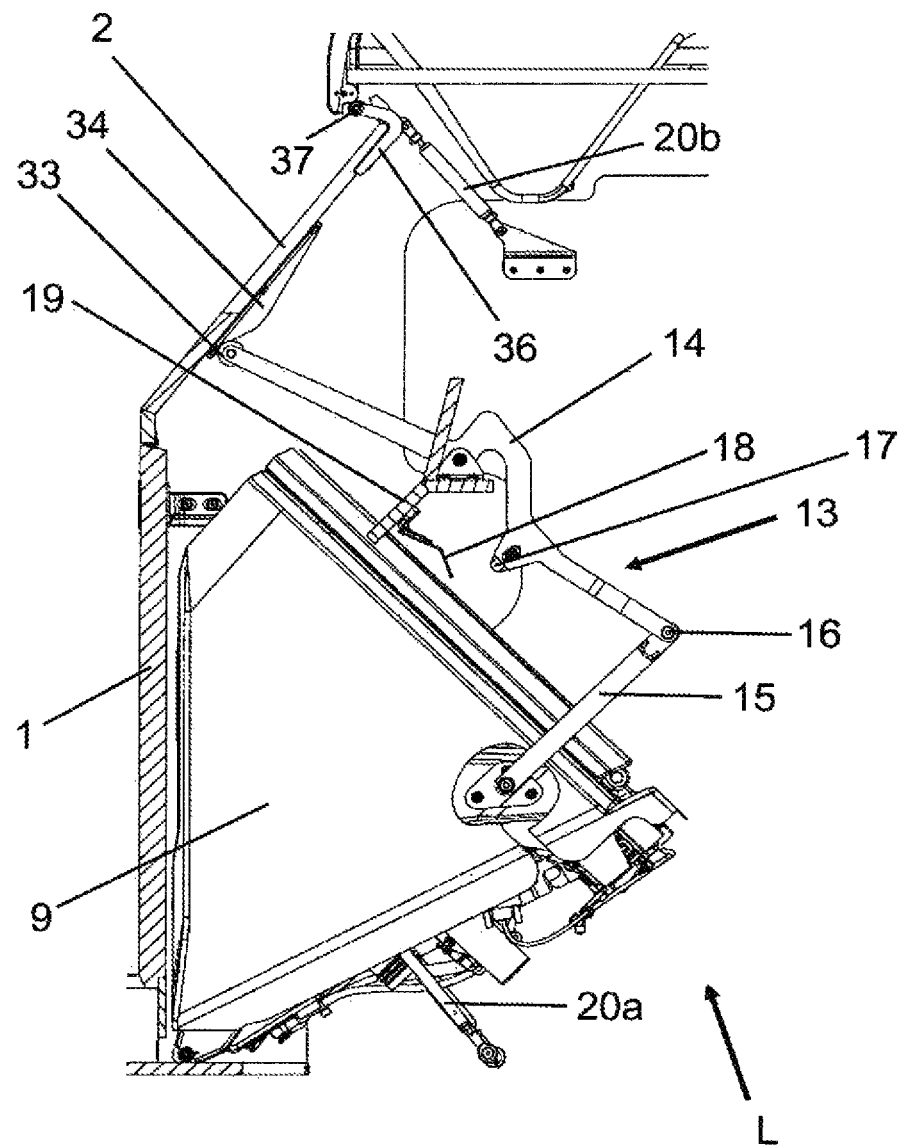
Figure 5:
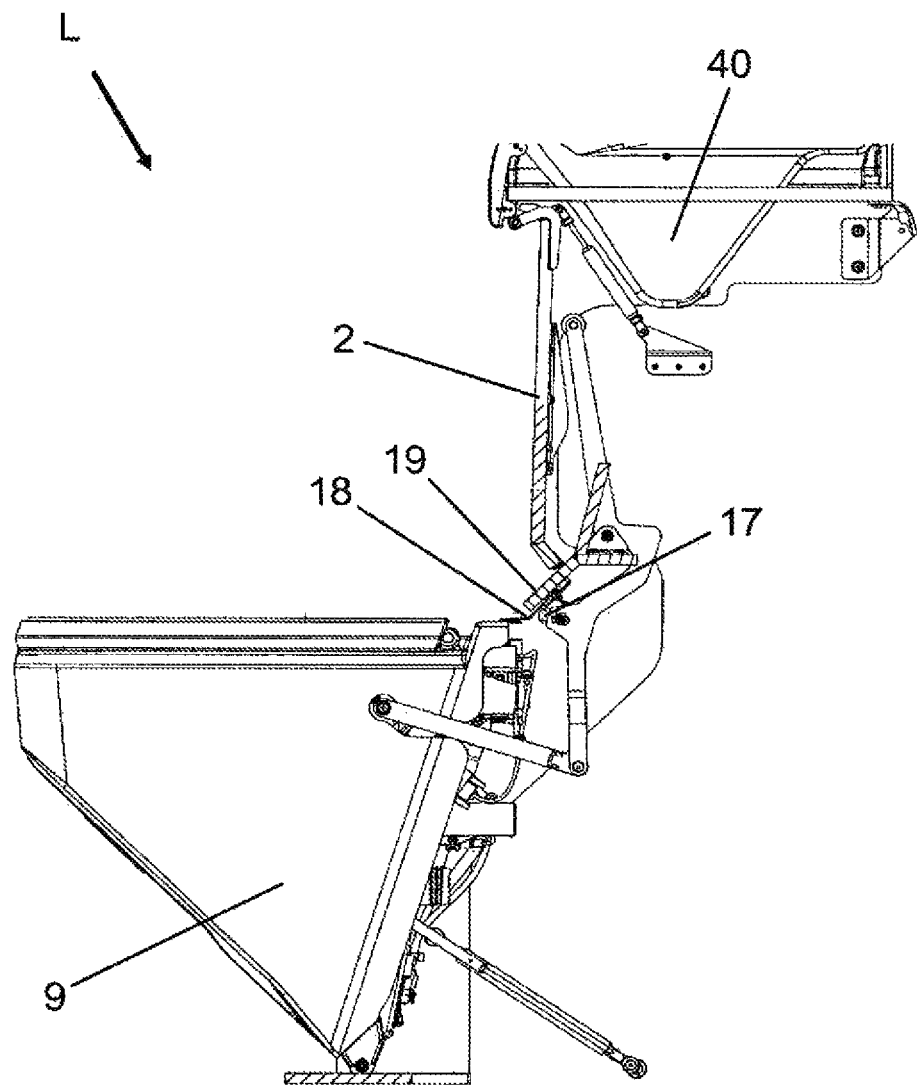
Figure 6:
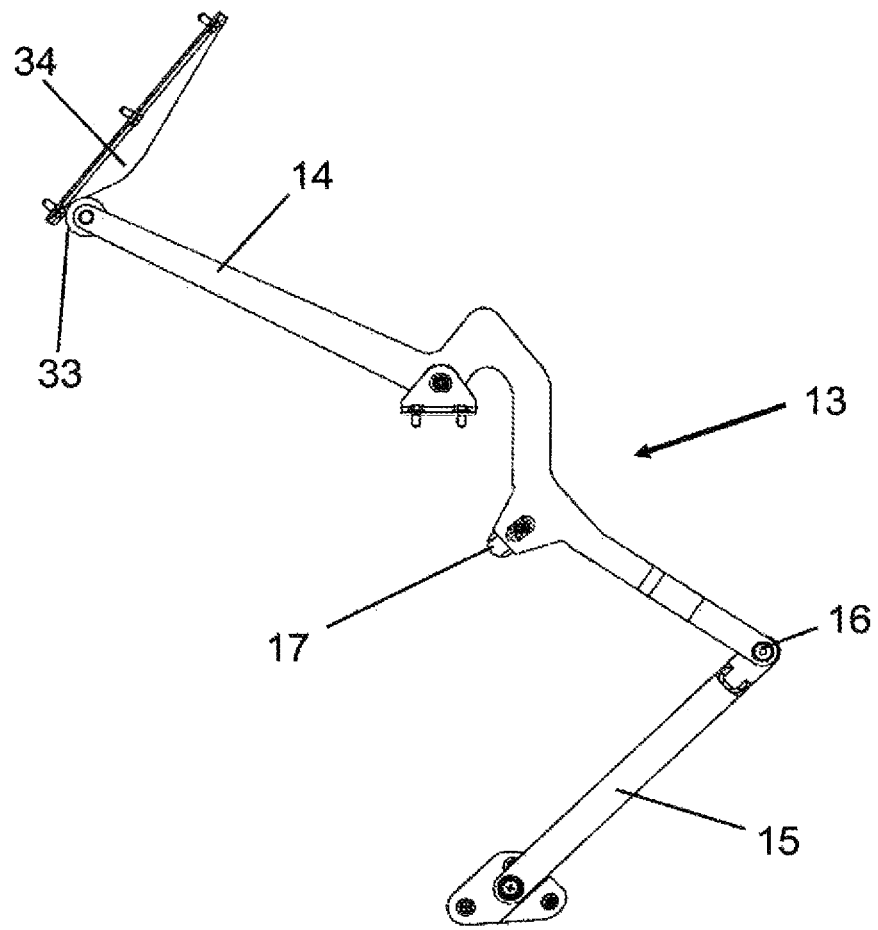
Figure 7A:
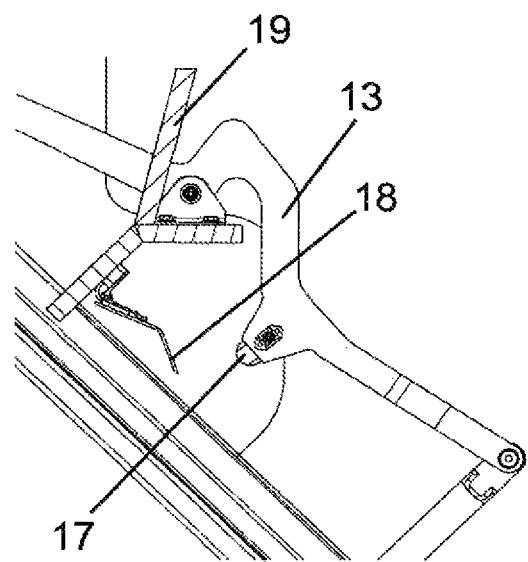
Figure 7B:
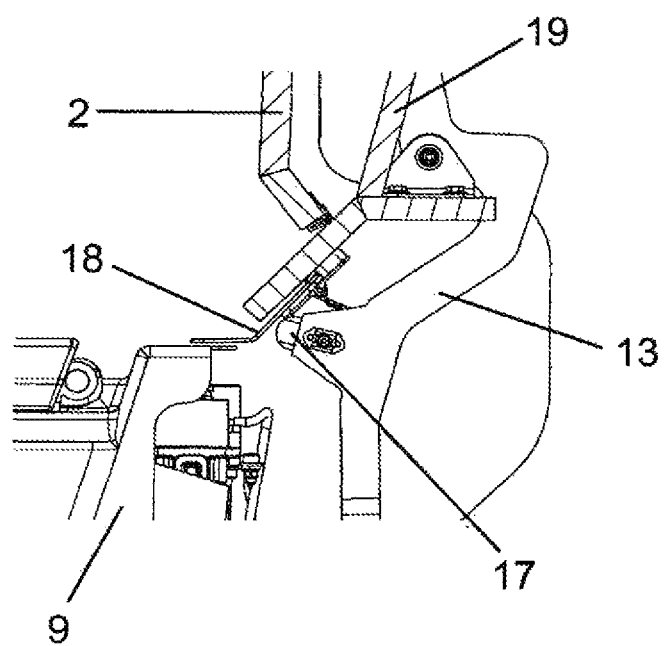
Figure 8:
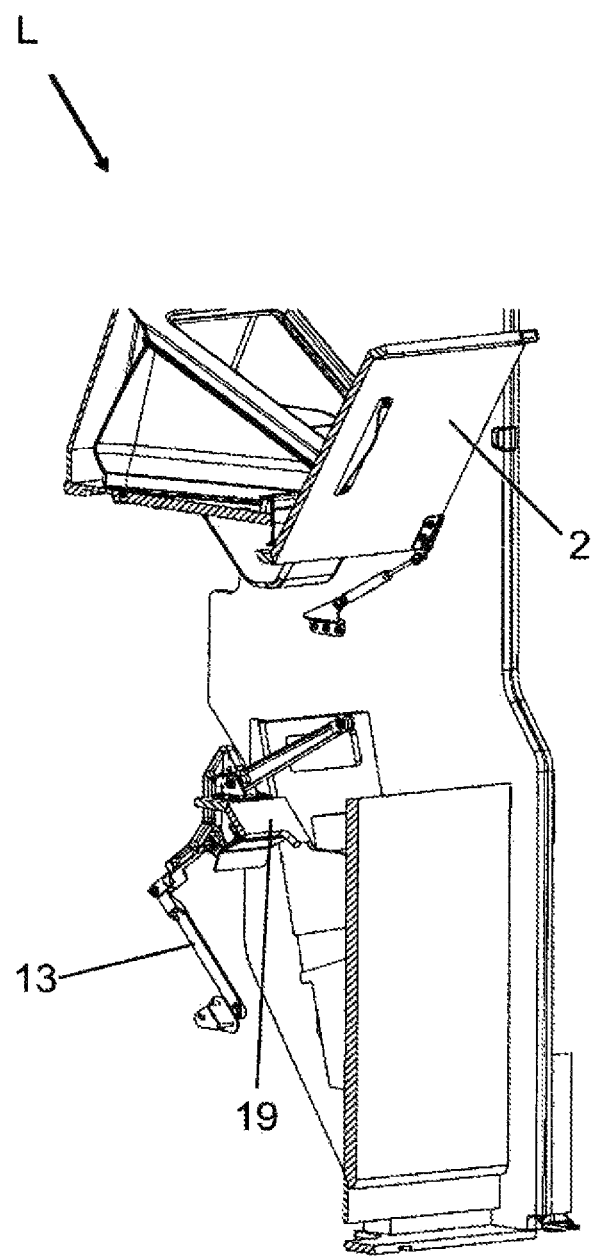
Figure 9:
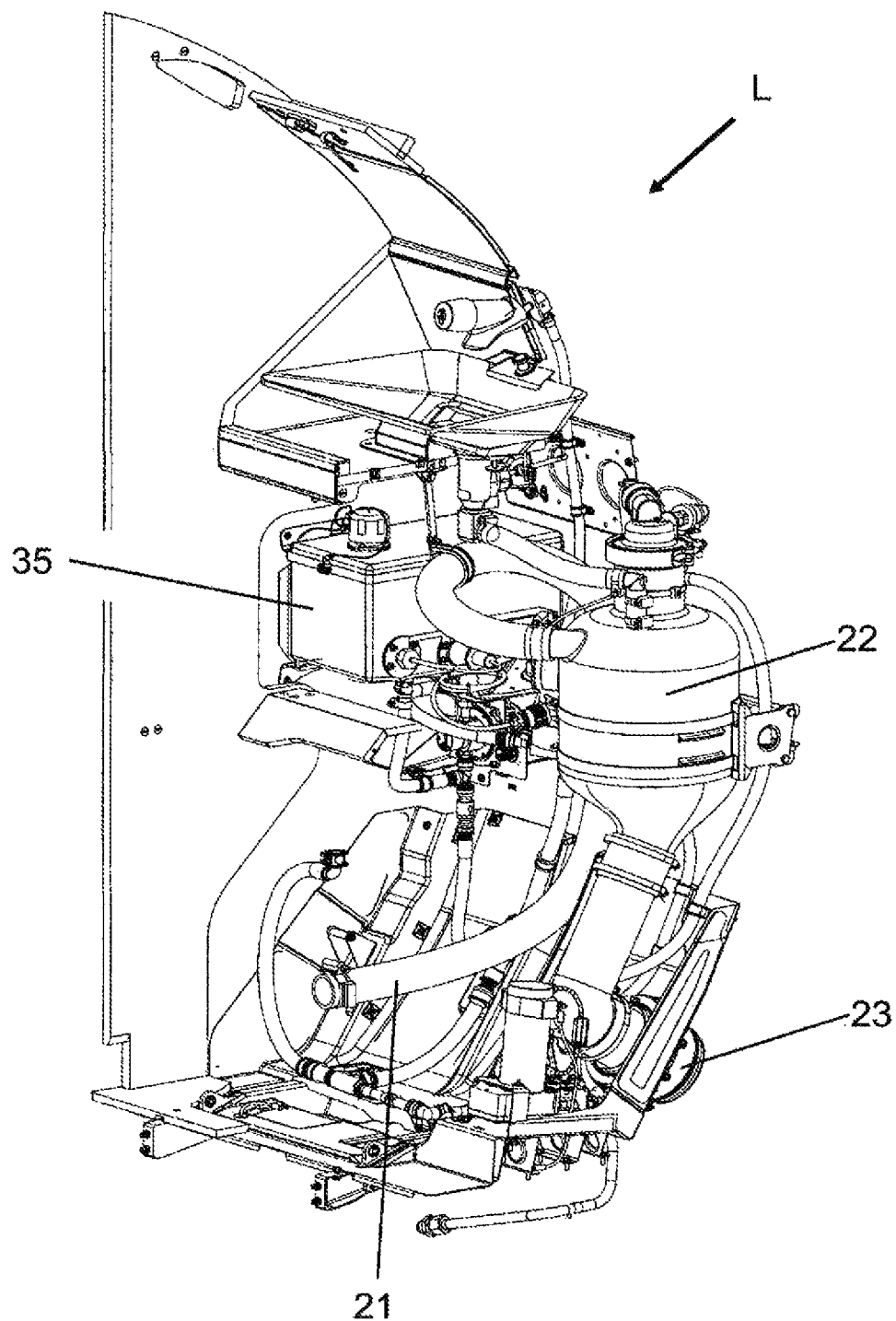
Figure 10:
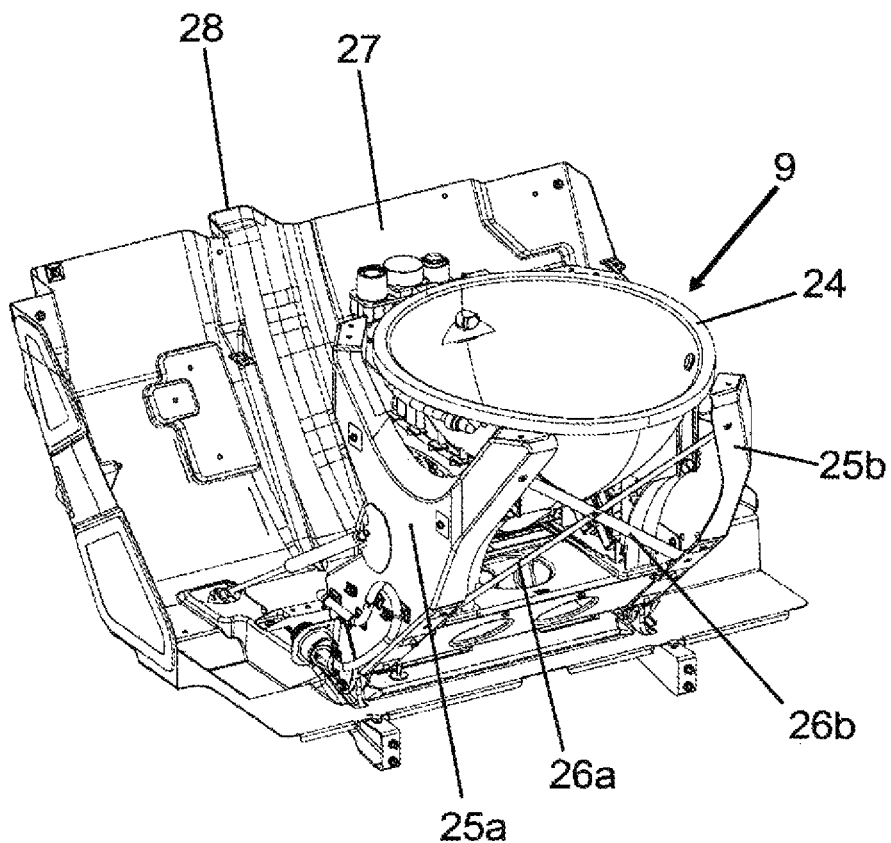
Figure 11:
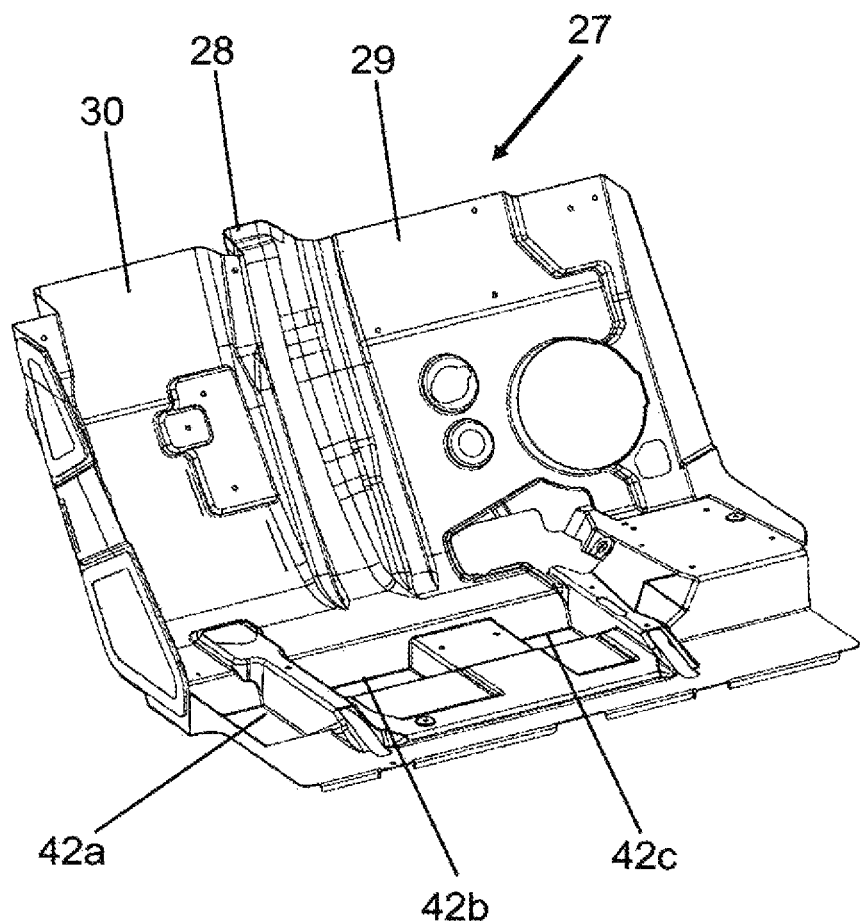
Figure 12:
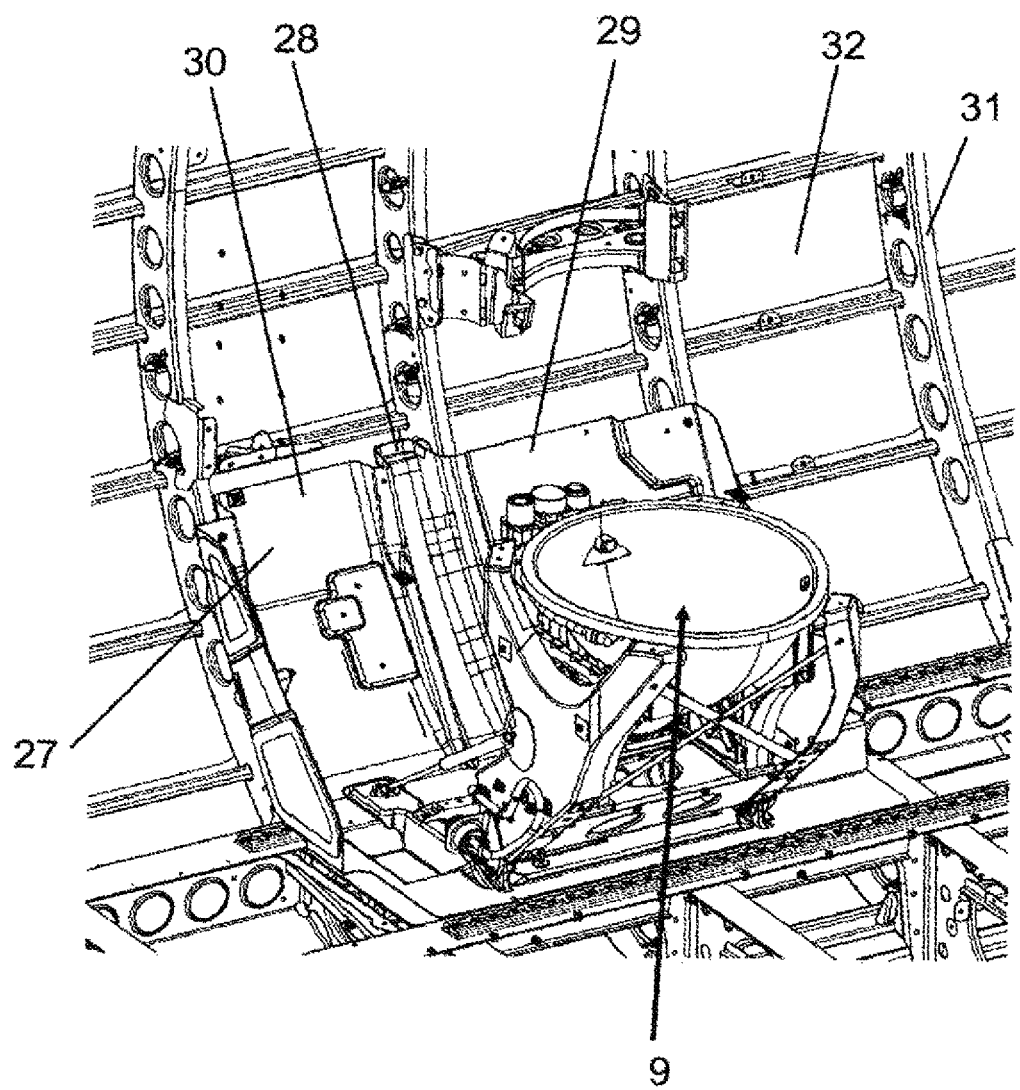

In the following, the disclosure is described in detail by means of drawings, wherein show:

FIG. 1: a perspective view of a lavatory arrangement according to one embodiment of the disclosure, with the toilet bowl in its folded-away state and the toilet cabinet door closed;

FIG. 2: a perspective view of the lavatory arrangement of FIG. 1, with the toilet bowl in its folded-out state and the toilet cabinet door opened;

FIG. 3: a perspective view of the lavatory arrangement of FIG. 1, with the toilet bowl in its folded-out state, the toilet cabinet door opened and a lid of the toilet bowl opened;

FIG. 4: a schematic partial view of the lavatory arrangement according to one embodiment of the disclosure, with the toilet bowl in its folded-away state;

FIG. 5: a schematic partial view of the lavatory arrangement of FIG. 4, with the toilet bowl in its folded-out state;

FIG. 6: a schematic side view of a lever arrangement according to one embodiment of the disclosure;

FIG. 7*a*: a schematic visualization of the interaction of the lever arrangement of FIG. 6 with other components of a lavatory arrangement according to one embodiment of the disclosure (toilet bowl in folded-away state);

FIG. 7*b*: a schematic visualization of the interaction of the lever arrangement of FIG. 6 with other components of a lavatory arrangement according to one embodiment of the disclosure (toilet bowl in folded-out state);

FIG. 8: a perspective partial view of a lavatory arrangement according to one embodiment of the disclosure, with the tiltable flap locked in an opened position;

FIG. 9: a perspective partial view of a lavatory arrangement according to one embodiment of the disclosure, with parts of the vacuum flushing system;

FIG. 10: a perspective partial view of a lavatory arrangement according to one embodiment of the disclosure, showing certain components of the toilet bowl;

FIG. 11: a perspective view of an exterior casing of a lavatory arrangement according to one embodiment of the disclosure; and FIG. 12: a perspective partial view of a lavatory arrangement according to one embodiment of the disclosure, showing certain components of the toilet bowl and the exterior casing mounted next to an aircraft exterior wall.

DESCRIPTION OF THE DISCLOSED EMBODIMENTS

FIG. 1 shows a perspective view of a lavatory arrangement L according to one embodiment of the disclosure. The lavatory arrangement L comprises a toilet cabinet door 1 arranged at the bottom of the lavatory arrangement L. The toilet cabinet door 1 is closed and therefore blocks the view of a toilet bowl hidden in a folded-away state behind the toilet cabinet door 1. Right above the toilet cabinet door 1—and thus also above the folded-away toilet bowl which cannot be observed in FIG. 1—is installed a tiltable flap 2. The tiltable flap 2 is configured to be rotated around a horizontal axis running through its upper end and can be positioned in various positions also referred to as states. In FIG. 1, the tiltable flap 2 is in a position which is referred to as its partly raised state.

Above the tiltable flap 2 are positioned other components of the lavatory arrangement L, namely a sink 3, a mirror 4, a towel compartment 5 and a tap 6. The towel compartment 5 comprises a towel box 38 configured to receive unused clean towels. The towel compartment 5 furthermore comprises a used towel dump opening 39 through which used towels can be dumped.

In some example embodiments, the lavatory arrangement comprises at least one lighting element, preferably an LED lighting element. The lavatory arrangement shown in FIG. 1, in particular a side wall of the lavatory arrangement L, furthermore comprises a door slit 7. In this door slit 7 is installed a sliding door 8 which can be pulled out of the door slit 7 in order to temporarily establish a partial separation between a user of the lavatory arrangement L—or in other words: the interior of the lavatory arrangement L and a rest of the cabin.

When the sliding door 8 is pulled out of the door slit 7, it does not move out horizontally but moves out in a direction inclined towards a ceiling of the cabin (not shown). Furthermore, the sliding door 8 comprises a top edge that is formed such that it constitutes a counterpart of the ceiling of the cabin when the sliding door 8 is completely pulled out of the door slit 7. Like this, the sliding door 8 establishes an essentially complete separation in an upper part of the cabin between an interior of a temporary lavatory compartment and the rest of the cabin. All this is of course not shown in FIG. 1 because the sliding door 8 is positioned inside the door slit 7 in FIG. 1.

FIG. 2 shows another perspective view of the lavatory arrangement L of FIG. 1, with the toilet bowl 9 now visible. The toilet bowl 9 is in its folded-out state and the toilet cabinet door 1 is open. The tiltable flap 2 is not in its partly raised state anymore (as it is the case in FIG. 1) but rather in a dropped-down state. While in the partly raised state in FIG. 1 the tiltable flap 2 *s* slightly slanted, the tiltable flap 2 is now arranged such that it creates a vertical wall. Thereby, additional space is created, especially for a user of the lavatory which sits on the toilet bowl 9 (user not shown). When the tiltable flap 2 moves from its partly raised state (shown in FIG. 1) to its dropped-down state (shown in FIG. 2) its proper weight helps to push the toilet bowl 9 from its folded-away state to its folded-out state. The technical concept by which this function is realized will be explained later.

What also becomes clear from looking at FIG. 2 is the following: when the toilet cabinet door 1 is completely swung open (as shown in FIG. 2), that is by approximately 90 degrees compared to its closed state, it is adapted to form an essentially complete separation between the lavatory arrangement L in use and a rest of the cabin (which in Figure has to be imagined on the right of the lavatory arrangement L) together with the sliding door 8 when this sliding door 8 is completely pulled out of the door lit 7. The toilet cabinet door 1 in its opened state is thus not encumbering a user of the lavatory arrangement 1 and is furthermore used for constituting a lower part of a door-and-wall arrangement 1, 8 of the lavatory arrangement L, wherein the door-and-wall arrangement comprises the toilet cabinet door 1 and the sliding door 8.

FIG. 2 also shows a lateral compartment 10 integrated in a housing of the toilet bowl 9. This lateral compartment 10 can be conveniently used for storing hygiene products, toilet paper or the like and making such articles easily available for users sitting on the toilet. The lateral compartment 10 is located on the left side of the toilet bowl 9 as seen when looking into FIG. 2. This means that a user sitting on the toilet bowl 9 can access the lateral compartment with his/her right hand. This is advantageous because most people are right-handed.

FIG. 2 furthermore shows a flush button 43 for flushing the toilet bowl 9 once it has been used. The flush button 43 is arranged such that it is covered by the tiltable flap 2 when the tiltable flap 2 is in its partly raised state and the toilet bowl 9 is thus in its folded-away state. In this context, "covered" is to be understood such that it is made difficult for a user of the lavatory arrangement L to reach the flush button 43 in a case where the toilet cabinet door 1 is opened but the toilet bowl 9 has not yet been swung out of its folded-away state. In other words: When the toilet bowl 9 is in its folded-away state, the tiltable flap 2 is configured to at least partly block and/or to impede an access to the flush button 43. This has the advantage of reducing the risk of a user flushing the toilet while the toilet bowl 9 is in its folded-away state—as a matter of fact, flushing the toilet in such a situation might lead to liquid being spilled into an interior of the lavatory arrangement L and thus to pollution and/or damage.

FIG. 3 is a perspective view of the lavatory arrangement L already shown in FIGS. 1 and 2, with the toilet bowl 9 in its folded-out state, the toilet cabinet door 1 opened and a lid 11 of the toilet bowl 9 now opened. It can be seen in FIG. 3 that the housing of the toilet bowl 9 comprises a partly inclined top surface, in particular an inclined area 12. This inclined area 12 has the advantage of optimizing the distribution of forces inside the toilet when a user props himself on the toilet in the region of the inclined area 12, in particular props himself on the inclined area 12. In particular, the inclined area 12 directions the force applied on the toilet bowl 9 in such case towards a center of the toilet bowl 9 and thus reduces the risk of damaging the toilet bowl 9 and/or other components of the lavatory arrangement L. Furthermore, the inclined area 12 has the advantage of facilitating the access to the lateral compartment 10 for a hand of a user sitting on the toilet bowl 9 (user not shown). It is pointed out that the lid 11 also comprises an inclined area which corresponds to the inclined area 12 of the housing of the toilet bowl 9. The reason for this is that a user can also sit on the lid 11 of the toilet bowl 9, not only when the aircraft lavatory L is in use but for example also when the toilet bowl 9 is used as a jump seat. One further advantage of the lid 11 also comprising an inclined area is the fact that the inclined area of the lid 11 creates a handle opening 41 when the lid 11 is lifted (as shown in FIG. 3). This handle opening 41 is in fact created between the lid 11 and the tiltable flap 2 and enables a user of the lavatory arrangement L to get hold of the lifted lid 11 in a convenient manner so as to close the lid 11.

FIG. 4 shows a schematic partial view of the lavatory arrangement L according to one embodiment of the disclosure, with the toilet bowl 9 in its folded-away state. The toilet bowl 9 is partly covered in the direction of an exterior of the lavatory arrangement L by the toilet cabinet door 1. The toilet bowl 9 is also partly covered by the tiltable flap 2, which is in its partly raised state in FIG. 4. The tiltable flap 2 is linked to the toilet bowl 9 by means of a lever arrangement 13. The lever arrangement 13 comprises a first lever component 14 and a second lever component 15 linked to each other by means of a lever articulation 16. The second lever component 15 is fixed to the toilet bowl 9 using any suitable fastener or fixation technique, for example screws or the like. The first lever component 14 is in contact with the tiltable flap 2 but is not fixed to it. In particular, the first lever component 14 comprises a roller 33 which is configured to roll back and forth in a roller guidance 34 of the tiltable flap 2 so as to allow the roller 33—and thus the entire lever arrangement 13—to move relatively to the tiltable flap 2 while staying in contact with it.

To bring the toilet bowl 9 from its folded-away state (shown in FIG. 4) into its folded-out state (not shown in FIG. 4), first of all the toilet cabinet door 1 is opened and then a release mechanism is activated. This can be done for example by pushing a button integrated in the housing of the toilet bowl 9. Then, the gas spring 20*a* starts pushing out the toilet bowl 9 in the direction where the toilet cabinet door 1 used to be. The moving toilet bowl 9 transmits its movement to the lever arrangement 13 causing the roller 33 to roll upwards on the roller guidance 34. Thereby, the tiltable flap 2 is gradually released from its partly raised state and slowly and/or progressively swings down into its dropped-down state. This swinging down is being facilitated on one hand by the proper weight of the tiltable flap 2 and on the other hand by the gas spring 20*b* which pushes on the top edge of the tiltable flap 2. Thus, the tiltable flap 2, while moving into its dropped-down state, also indirectly helps to push the toilet bowl 9 into its folded-out state (shown in FIG. 5).

The tiltable flap 2 shown in FIG. 4 comprises two hook elements 36 of which only one is visible in FIG. 4 (because FIG. 4 is partly a cross-sectional view). It can be observed that one end of the hook element 36 is attached to a main body of the tiltable flap 2 whereas another end of the hook element 36 is attached to a flap articulation 37 of the lavatory arrangement.

It can further be observed in FIG. 4 that the roller guidance 34 has a rounded edge, wherein the rounded edge is asymmetrical and is steeper and more strongly expressed on a lower end of the roller guidance 34, wherein the lower end of the roller guidance 34 is that end that is located further away from the hook element 36. When the tiltable flap 2 is moved, for example from its partly raised state to its dropped-down state, the roller 33 follows the rounded edge. The rounded edge is configured so that it controls the movement of the tiltable flap 2 in such a way that a collision between the tiltable flap 2 and the toilet bowl 9 is avoided when these two components are in motion.

FIG. 4 also shows that lever arrangement 13 is fixed to a carrying structure 19 of the lavatory arrangement L. To this carrying structure 19 is attached a tiltable sealing cover 18, configured to close a gap between the toilet bowl 9 and the carrying structure 19 of the lavatory arrangement L when the toilet bowl 9 is in its folded-out state. This will be shown in FIG. 5. Furthermore, the first lever component 14 comprises a pushing nose 17 configured to get into contact with the sealing cover 18 when the toilet bowl 9 is brought from its folded-away state into its folded-out state and to thereby progressively push the sealing cover 18 in its desired position.

FIG. 5 shows a schematic partial view of the lavatory arrangement L already shown in FIG. 4, with the toilet bowl 9 now in its folded-out state. It can be seen that—compared to its partly raised state in FIG. 4—the tiltable flap 2 has been completely transferred into its dropped-down state. Furthermore, the pushing nose 17 has pushed the sealing cover 18 into its desired position so that it covers a gap between the toilet bowl 9 and the carrying structure 19.

FIG. 5 also shows a used towel compartment 40. This used towel compartment 40 is located underneath the used towel dump opening 39 (see FIG. 1 for example). Used towels dumped into the used towel dump opening 39 end up in the used towel compartment 40 and can be collected during maintenance of the lavatory arrangement L.

FIG. 6 shows a schematic side view of a lever arrangement 13 according to one embodiment of the disclosure, the lever arrangement 13 comprising the first lever component 14 with its roller 33 and the second lever component 15 linked to the first lever component 14 by means of the lever articulation 16. Also clearly visible is the pushing nose 17. Furthermore, shown in FIG. 6 is the roller guidance 34 of the tiltable flap 2 (not shown in FIG. 6 but for example in FIG. 5), which is in contact with the roller 33.

FIG. 7*a* shows a schematic visualization of the interaction of the lever arrangement 13 of FIG. 6 with other components of a lavatory arrangement L according to one embodiment of the disclosure. The visualization corresponds to the case where the toilet bowl 9 is in its in folded-away state. This visualization is a zoom-in on the part of the lever arrangement 13 which comprises the pushing nose 17 and furthermore shows the sealing cover 18 which is linked to the carrying structure 19 by means of a spring, in particular a partly bent spiral spring.

FIG. 7*b* shows essentially the same components as FIG. 7*a*, the difference between the two Figures being the fact that the toilet bowl 9 is now in its folded-out state: the tiltable flap 2 is thus in its dropped-down state (in FIG. 7*a* it is in its partly raised state and thus not visible) and the pushing nose 17 of the lever arrangement 13 has pushed the sealing cover 18 forward such that it covers a gap between the toilet bowl 9 and the carrying structure 19.

FIG. 8 shows a perspective partial view of a lavatory arrangement L according to one embodiment of the disclosure, with the tiltable flap 2 locked in an opened position. This opened position can typically be reached by lifting the tiltable flap 2 as much as possible, i.e. further upwards than the partly raised state. In this opened position, the lever arrangement 13 which is attached to the carrying structure 19 is not in contact with the tiltable flap 2 anymore. The opened position of the tiltable flap 2 is advantageous for reaching the interior of the lavatory arrangement L, in particular the vacuum flushing system (not shown in FIG. 8), for example for filling the fresh water tank with fresh water.

Furthermore, other maintenance steps of the lavatory arrangement L can easily be carried out when the tiltable flap 2 is in its opened position. For example, in a particular embodiment, the lavatory arrangement L comprises a control panel which is configured to indicate system parameters of the lavatory arrangement L (e.g. fill level of waste container). In some example embodiments, the control panel comprises a check button and a status lamp. When this check button is pushed and the lavatory arrangement L is ready for use (e.g. waste container emptied, fresh water tank filled), the status lamp indicates this readiness. On the other hand, if the check button is pushed and the lavatory arrangement L is not ready for use, this fact can also be indicated by the status lamp and/or by a second status lamp. When a pilot boards the aircraft, one step of his aircraft control sequence could be to lift the tiltable flap 2 into its opened position and push the check button in order to know the status of the lavatory arrangement L. If this leads to the finding that the lavatory arrangement L is ready for use, the pilot can mark this in a logbook or the like or simply acknowledge this. If pushing the check button leads to the fact that the lavatory arrangement L is not ready for use, the pilot can arrange for the lavatory arrangement L to be serviced.

FIG. 9 shows a perspective partial view of a lavatory arrangement L according to one embodiment of the disclosure, with parts of the vacuum flushing system. In particular, FIG. 9 shows a waste hose 21. The open end of the waste hose, i.e. the loose end which is closest to the viewer of FIG.

9, is configured to be connected to a bottom of the toilet bowl 9 (not shown in FIG. 9). From this open end, the waste hose 21 moves backwards, then upwards (this part of the waste hose 21 is partly covered by a waste container 22 in FIG. 9), then takes a long and not too narrow turn before finally reaching the waste container 22. The waste container 22 can be emptied through a waste collection point 23 which is typically integrated in an aircraft exterior wall (not shown in FIG. 9) and/or located at a rear side of the lavatory arrangement L. FIG. 9 furthermore shows a fresh water tank 35 configured to be connected to a funnel arrangement (not shown in FIG. 9) and configured to be filled with fresh water from an inside of the aircraft and/or a front side of the lavatory arrangement L.

FIG. 10 shows a perspective partial view of a lavatory arrangement L according to one embodiment of the disclosure, showing certain components of the toilet bowl 9. In particular, it is shown that the toilet bowl 9 comprises an interior bowl 24, which is carried by two lateral Y-formed carrying elements 25a, 25b. These Y-formed elements 25a, 25b are also configured to carry a toilet bowl housing. This toilet bowl housing—which was shown for example in FIG. 3 with partly inclined top surface and lateral compartment 10—is not shown in FIG. 10 in order to make it possible to see those components of the toilet bowl 9 which are usually hidden under the toilet bowl housing. The toilet bowl 9 further comprises two cross beams 26a, 26b. Cross beam 26a links a lower part of Y-formed carrying element 25a with a front top arm of Y-formed carrying element 25b. Cross beam 26b links a lower part of Y-formed carrying element 25b with a front top arm of Y-formed carrying element 25a. Like this, the cross beams 26a, 26b add stability to the toilet bowl 9. Furthermore, FIG. 10 shows that the toilet bowl 9 is mounted on and is partly surrounded by an exterior casing 27. Amongst other features, this exterior casing 27 comprises a guiding channel 28 which is configured to guide the waste hose 21 (see FIG. 9), at least when the toilet bowl 9 is in its folded-away state.

It is pointed out that the "toilet bowl 9" as referred to throughout the application could also be described as "toilet arrangement", typically comprising elements like the interior bowl 24, a toilet bowl housing (visible in FIGS. 2 and 3 for example but not equipped with a reference sign), the Y-formed carrying elements 25a, 25b, the cross beams 26a, 26b and other elements like for example a push button for unfolding the toilet bowl 9.

FIG. 11 shows a perspective view of an exterior casing 27 of a lavatory arrangement L according to one embodiment of the disclosure. The elongated guiding channel 28 is now visible in its entirety and it can be observed that the guiding channel 28, which has an elongated concave form when looked at the exterior casing 27 from above, is the part of the exterior casing 27 that protrudes the most from the exterior casing 27 towards a rearward direction (i.e. away from a person looking at FIG. 11). In particular, a lift side 30 of the exterior casing 27 protrudes less far towards the rearward direction than the guiding channel 28, and a right side 29 of the exterior casing 27 protrudes even less far towards the rearward direction. In other words: the guiding channel 28 sticks out of the back of the exterior casing 27.

The exterior casing 27 shown in FIG. 11 furthermore comprises an integrated liquid retention system comprising three retention basins 42a, 42b, 42c. The liquid retention system is configured such that essentially all liquid that manages to get out of any liquid containing parts of the lavatory arrangement L—for example the waste container 22, the waste hose 21, the fresh water tank 35 and/or any connection hoses or the like—is eventually guided to one of the retention basins 42a, 42b, 43c. The liquid retention system also works well for collecting liquid that enters the lavatory arrangement L from its outside, for example in cases where the sealing cover 18 is broken or is not working properly. The liquid retention system thus keeps liquid from being spilled out of the lavatory arrangement L and into a vehicle fuselage, especially an aircraft fuselage, in which it is installed. This has the advantage of avoiding pollution of the fuselage.

FIG. 12 shows a perspective partial view of a lavatory arrangement L according to one embodiment of the disclosure, showing certain components of the toilet bowl 9 and the exterior casing 27 mounted next to an aircraft exterior wall 32. FIG. 12 also shows several aircraft structure elements 31 of an aircraft. The exterior casing 27 is formed around the aircraft structure elements 31 where necessary. If an insulation material (not explicitly shown) is present next to the aircraft exterior wall 32—and thus also between the exterior casing 27 and the aircraft exterior wall 32 (i.e. behind the exterior casing 27), then this insulation material is compressed most strongly by the guiding channel 28, less strongly or not at all by the left side 30 of the exterior casing and 27 and even less strongly or not at all by the right side 29 of the exterior casing 27. This means that a reduction of insulation efficiency is avoided because the exterior casing 27 is formed such as to compress the insulation material only locally if this is absolutely indispensable, e.g. because the waste hose 21 (see FIG. 9) needs space.

In one example embodiment, the toilet bowl is configured to be used as jump seat. For this purpose, the toilet bowl preferably comprises a seat cushion and/or the lavatory arrangement comprises a safety belt and/or the lavatory arrangement is configured in such a way that a back rest can be temporarily installed in connection with the toilet bowl being used as a jump seat, wherein the tiltable flap preferably comprises a means for installing the back rest.

In one typical embodiment, the lavatory arrangement is configured in such a way that the folding and unfolding of the toilet bowl can be done electrically. In particular, the lavatory arrangement preferably comprises at least one electric actuator for moving the toilet bowl.

In a particular embodiment, the lavatory arrangement is configured in such a way that waste created by the use of the lavatory arrangement is evacuated from an outside of a vehicle, in particular an aircraft, in which the lavatory arrangement is installed. In particular embodiments, the lavatory arrangement comprises a mechanism for rinsing at least certain parts of the lavatory arrangement, for example the waste container and/or the waste hose and/or at least certain components of the vacuum flushing system when the waste is evacuated. Preferably, the lavatory arrangement is configured to carry out this rinsing automatically each time the waste is being evacuated from the lavatory arrangement.

In a particular embodiment, the lavatory arrangement is configured such that it can be attached to a lateral wall of an aircraft fuselage, wherein the toilet bowl is preferably configured to swing out towards an interior of the aircraft cabin, wherein a swing-out direction is preferably directed perpendicularly to the lateral wall.

LIST OF REFERENCE SIGNS

1 Toilet cabinet door
2 Tiltable flap
3 Sink
4 Mirror

5 Towel compartment
6 Water tap
7 Door slit
8 Sliding door
9 Toilet bowl
10 Lateral compartment
11 Lid
12 Inclined area
13 Lever arrangement
14 First lever component
15 Second lever component
16 Lever articulation
17 Pushing nose
18 Sealing cover
19 Carrying structure
20a, 20b Gas springs
21 Waster hose
22 Waste container
23 Waste collection point
24 Interior bowl
25a, 25b Y-formed carrying elements
26a, 26b Cross beams
27 Exterior casing
28 Guiding channel
29 Right side of exterior casing
30 Left side of exterior casing
31 Aircraft structure element
32 Aircraft exterior wall
33 Roller
34 Roller guidance
35 Fresh water tank
36 Hook element
37 Flap articulation
38 Towel box
39 Used towel dump opening
40 Used towel compartment
41 Handle opening
42a, 42b, 42c Retention basins
43 Flush button
L Lavatory arrangement

What is claimed is:

1. A lavatory arrangement, comprising:
a vacuum flushing system;
a folding toilet comprising a housing and an interior bowl, wherein the interior bowl is disposed within the housing; and
a toilet cabinet door that moves between a folded-away state and a folded-out state, wherein the toilet cabinet door forms part of a door-and-wall arrangement in the folded-out state.

2. The lavatory arrangement of claim 1, wherein the lavatory arrangement is an aircraft lavatory arrangement.

3. The lavatory arrangement of claim 1, further comprising a tiltable flap, wherein the tiltable flap is configured to facilitate an unfolding of the toilet.

4. The lavatory arrangement of claim 3, further comprising a lever arrangement that links the toilet to the tiltable flap.

5. The lavatory arrangement of claim 1, further comprising an exterior casing that partially encloses the flushing system and the toilet, wherein the exterior casing comprises a guiding channel for a waste hose, wherein the guiding channel is at least partially defined by an elongated cavity.

6. The lavatory arrangement of claim 1, wherein the door-and-wall arrangement which, when deployed, forms a lavatory compartment.

7. The lavatory arrangement of claim 6, wherein the door-and-wall arrangement comprise a cabinet door in an open position and a sliding door, wherein the cabinet door encloses the toilet when the toilet is in a folded-away state.

8. The lavatory arrangement of claim 1, wherein the toilet moves between a folded-away state and a folded-out state, wherein the lavatory arrangement further comprises a carrying structure and a sealing cover, wherein, when the toilet moves toward the folded-out state, the sealing cover moves into a gap between the toilet and the carrying structure.

9. The lavatory arrangement of claim 1, further comprising a first Y-formed carrying element, a second Y-formed carrying element, and a pair of cross beams, wherein the first and second Y-formed carrying elements are coupled to and support the toilet, wherein the pair of cross beams are coupled to the first and second Y-formed carrying elements.

10. The lavatory arrangement of claim 9, wherein the first and second Y-formed carrying elements comprise carbon fiber, wherein the pair of cross beams comprise metal, wherein the toilet is formed using at least one housing sheet of metal.

11. The lavatory arrangement of claim 1, further comprising at least one gas spring that comprises a heating mechanism, wherein the at least one gas spring is configured to move the toilet between a folded-away state and a folded-out state.

12. The lavatory arrangement of claim 1, wherein the toilet comprises at least one of: (a) a top surface that is partly inclined relative to a toilet seat; or (b) a lateral compartment.

13. An aircraft comprising the lavatory arrangement of claim 1.

14. The aircraft of claim 13, further comprising: a cockpit, a cabin, and a cabinet, wherein the lavatory arrangement is positioned between the cockpit and the cabin such that when a cabinet door of the cabinet is in an open position, the cabinet door forms a barrier between the lavatory arrangement and the cockpit.

15. A vehicle having a lavatory arrangement, wherein the lavatory arrangement comprises:
a pivotable toilet;
a lever arrangement coupled to the toilet;
a tiltable flap spaced from the toilet and in contact with the lever arrangement such that when the toilet is moved between a folded-away state and a folded-out state, the tiltable flap moves between a first position and a second position;
an exterior casing; and
a cabinet door coupled to the exterior casing, wherein the cabinet door moves between (i) a closed position that corresponds with the toilet in a folded-away state and (ii) an open position that permits the toilet to pivot to the folded-out state, and wherein, when the cabinet door is in the closed position, a lower edge of the tiltable flap is proximate an upper edge of the cabinet, and wherein the vehicle is an aircraft.

16. A lavatory arrangement, comprising:
a vacuum flushing system;
a folding toilet comprising a housing and an interior bowl, wherein the interior bowl is disposed within the housing; and
a door-and-wall arrangement which, when deployed, forms a lavatory compartment, wherein the door-and-wall arrangement comprise a cabinet door in an open position and a sliding door, and wherein the cabinet door encloses the toilet when the toilet is in a folded-away state.

17. An aircraft comprising the lavatory arrangement of claim 16.

18. A lavatory arrangement, comprising:
a vacuum flushing system;
a folding toilet comprising a housing and an interior bowl, wherein the interior bowl is disposed within the housing;
a carrying structure; and
a sealing cover, wherein the toilet moves between a folded-away state and a folded-out state, and wherein, when the toilet moves toward the folded-out state, the sealing cover moves into a gap between the toilet and the carrying structure.

19. An aircraft comprising the lavatory arrangement of claim 18.

20. A lavatory arrangement, comprising:
a vacuum flushing system;
a folding toilet comprising a housing and an interior bowl, wherein the interior bowl is disposed within the housing;
a first Y-formed carrying element;
a second Y-formed carrying element; and
a pair of cross beams wherein the first and second Y-formed carrying elements are coupled to and support the toilet, and wherein the pair of cross beams are coupled to the first and second Y-formed carrying elements.

21. An aircraft comprising the lavatory arrangement of claim 20.

* * * * *